June 24, 1958 W. A. BEDFORD, JR 2,839,805
FASTENING DEVICE
Filed March 15, 1955
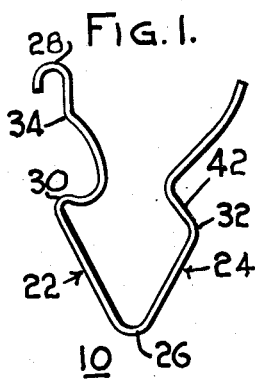
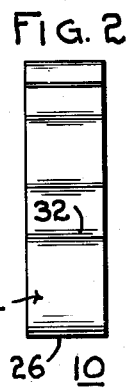
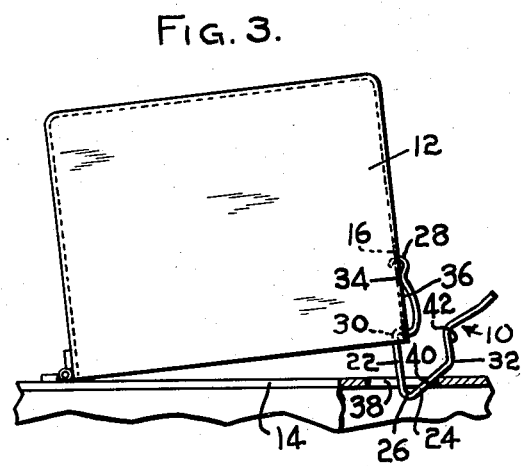
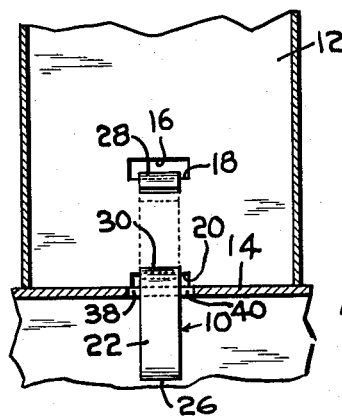
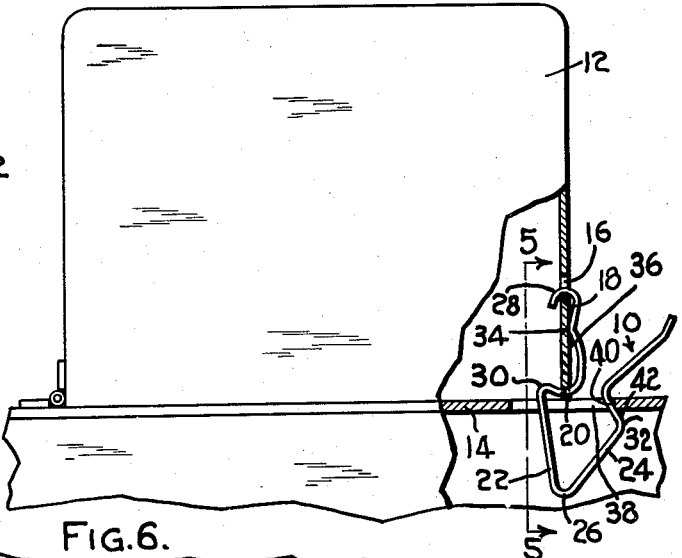
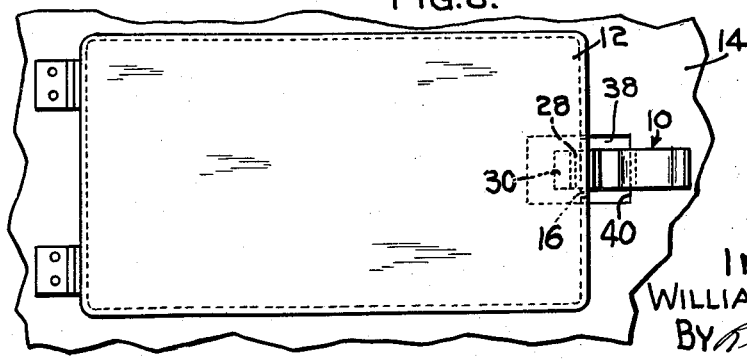
INVENTOR:
WILLIAM A. BEDFORD JR.,
BY Robert E Ross
ATTORNEY.

United States Patent Office 2,839,805
Patented June 24, 1958

2,839,805

FASTENING DEVICE

William A. Bedford, Jr., North Scituate, Mass., assignor to United-Carr Fastener Corporation, Cambridge, Mass., a corporation of Delaware Application March 15, 1955, Serial No. 494,442

1 Claim. (Cl. 24—84)

This invention relates generally to fastening devices and has particular reference to a resilient clip for attaching an article to a support.

The object of the invention is to provide a clip which may be rapidly secured to an article to enable it to be removably secured to a support.

Another object of the invention is to provide a clip which has means for engaging an article by resiliently gripping spaced oppositely facing edge portions and means for extending therefrom for snapping engagement into a support aperture.

Other objects of the invention will, in part, be obvious, and will, in part, appear hereinafter.

In the drawing:

Fig. 1 is a view in side elevation of a fastening device embodying the features of the invention;

Fig. 2 is a view of the device of Fig. 1 as seen from the right side;

Fig. 3 is a view in side elevation, partly in section of the device of Fig. 1, secured to an article to be attached to a support panel;

Fig. 4 is a view in side elevation, partly in section of the assembly of Fig. 3, snapped into engagement with a support panel; and Fig. 5 is a view in section taken on line 5—5 of Fig. 4; and Fig. 6 is a top plan view of the assembly of Fig. 5.

Referring to the drawing, there is illustrated a fastening device 10, which is adapted for attachment to an article 12 to enable said article to be secured to a support 14.

The article 12 may be a sheet metal cover for a piece of electrical apparatus, such as a transformer (not shown) or the like, and the support may be the chassis of a piece of electronic apparatus, such as radio, television or radar equipment.

In the illustrated embodiment the article 12 is provided with an aperture 16 spaced from an edge thereof, thereby providing an edge portion 18 spaced from the lower edge 20 and facing in a direction opposite thereto.

The fastener 10, in the illustrated embodiment, is formed of a single piece of resilient material, such as metal or plastic and comprises a pair of collateral legs 22 and 24 joined at an acute angle at a nose 26. The leg 22 is provided with outwardly facing means thereof for resiliently gripping the spaced edges 18 and 20 and comprises a hook portion 28 at the end of the leg for hooking over the upper edge 18, and a shoulder portion 30 spaced from the hook 28 for snapping into engagement with the lower edge 20.

The leg 24 is inclined outwardly from the leg 22 and is provided with an inwardly extending portion forming a shoulder 32 for engaging an edge of a support panel aperture as will appear hereinafter.

The fastener 10 is assembled with the article 12 by hooking the portion 28 over the edge 18 and snapping the shoulder 30 over the edge 20. To insure that the fastener tightly engages the article, the portion of the fastener between the hook 28 and the shoulder 30 is provided with an outwardly projecting portion 34 so that when the fastener is engaged with the article the portion 34 bears tightly against the portion 36 of the article between the edges 18 and 20.

After the fastener 10 is assembled with the article 12, as described above, the article may be attached to the support 14 by inserting the nose 26 into an opening 38 in the support having a suitable size and shape so that the shoulder 32 snaps into engagement with an edge 40 thereof, and the inclined portion 42, above the shoulder, tends to draw the article down tightly against the panel.

After such assembly the article 12 may be removed from the panel by flexing the end of the leg 24 inwardly to release the shoulder 32 from the edge 40 of the aperture.

Any suitable number of fasteners may be used to retain the article on the panel, or, if desired, the article may be hinged to the panel on one end and the other end attached to the panel by one or more fasteners as described above.

Since certain other obvious modifications may be made in the device without departing from the scope of the invention, it is intended that all matter contained herein be interpreted in an illustrative and not in a limiting sense.

I claim:

A resilient clip for attaching an article to an apertured panel, said clip comprising a pair of collateral legs joined at an acute angle at a nose portion, one of said legs having longitudinally spaced means formed thereon facing away from the other leg for resiliently gripping oppositely facing spaced edges of said article, said means comprising hook means for hooking over one of said edges, and shoulder means spaced longitudinally therefrom for snapping over the other edge, said other leg having outwardly facing shoulder means for snapping engagement with an edge of the aperture in the panel.

References Cited in the file of this patent

UNITED STATES PATENTS

| 2,192,160 | Tinnerman | Feb. 27, 1940 |
| 2,265,957 | Tinnerman | Dec. 9, 1941 |
| 2,520,725 | Judd | Aug. 29, 1950 |

FOREIGN PATENTS

| 1,086,678 | France | Aug. 11, 1954 |